United States Patent
Wang et al.

(10) Patent No.: US 8,605,973 B2
(45) Date of Patent: Dec. 10, 2013

(54) GRAPH CUTS-BASED INTERACTIVE SEGMENTATION OF TEETH IN 3-D CT VOLUMETRIC DATA

(75) Inventors: Su Wang, San Jose, CA (US); Shengyang Dai, San Jose, CA (US); Xun Xu, Palo Alto, CA (US); Akira Nakamura, San Jose, CA (US)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/423,211

(22) Filed: Mar. 17, 2012

(65) Prior Publication Data

US 2013/0243289 A1 Sep. 19, 2013

(51) Int. Cl.
*G06K 9/00* (2006.01)

(52) U.S. Cl.
USPC ................................ 382/128; 128/922; 378/4

(58) Field of Classification Search
USPC ................. 382/100, 128, 129, 130, 131, 132; 128/922; 378/4–27
See application file for complete search history.

(56) References Cited

U.S. PATENT DOCUMENTS

| | | | |
|---|---|---|---|
| 5,381,518 A | 1/1995 | Drebin et al. | |
| 7,739,623 B2* | 6/2010 | Liang et al. | 715/848 |
| 8,358,823 B2* | 1/2013 | Porikli et al. | 382/128 |
| 8,369,590 B2* | 2/2013 | Wang et al. | 382/128 |
| 2005/0163357 A1* | 7/2005 | Makram-Ebeid et al. | 382/128 |
| 2005/0259855 A1* | 11/2005 | Dehmeshki | 382/131 |
| 2007/0003131 A1* | 1/2007 | Kaufman | 382/154 |
| 2008/0030497 A1 | 2/2008 | Hu et al. | |
| 2008/0260221 A1* | 10/2008 | Unal et al. | 382/128 |
| 2009/0304280 A1 | 12/2009 | Aharoni et al. | |
| 2010/0316268 A1* | 12/2010 | Liang et al. | 382/128 |

* cited by examiner

*Primary Examiner* — Anand Bhatnagar
(74) *Attorney, Agent, or Firm* — Haverstock & Owens LLP

(57) ABSTRACT

An interactive segmentation framework for 3-D teeth CT volumetric data enables a user to segment an entire dental region or individual teeth depending upon the types of user input. Graph cuts-based interactive segmentation utilizes a user's scribbles which are collected on several 2-D representative CT slices and are expanded on those slices. Then, a 3-D distance transform is applied to the entire CT volume based on the expanded scribbles. Bony tissue enhancement is added before feeding 3-D CT raw image data into the graph cuts pipeline. The segmented teeth area is able to be directly utilized to reconstruct a 3-D virtual teeth model.

25 Claims, 6 Drawing Sheets

GRAPH CUTS-BASED INTERACTIVE SEGMENTATION OF TEETH IN 3-D CT VOLUMETRIC DATA

FIELD OF THE INVENTION

The present invention relates to the field of image processing. More specifically, the present invention relates to interactive segmentation.

BACKGROUND OF THE INVENTION

In modern dentistry, 3-D shapes of teeth and the positions of roots are very important in computer assisted procedures, such as surgical pre-operative planning and navigation, mechanized dental implant, post-operative assessments and cosmetic surgeries.

Existing literature for teeth segmentation is mostly limited to the data format of conventional and/or panoramic X-ray imaging. In the last decade, CT has become the most frequently used imaging modality to provide clinical datasets for dental preoperative and intra-operative planning.

A general interactive segmentation framework includes a friendly user interface which enables users to impose certain hard constraints, anywhere within the image domain, to mark certain pixels to be absolutely part of the image foreground and background, respectively. Although the total number of marked pixels is very limited, sometimes no more than several hundred, they are the interactive clues which are able to be utilized by a graph cuts segmentation algorithm. By presenting the instant results to the user, second-round interaction is to be given again if there is a need to make modifications. This interaction procedure repeats until the user feels satisfied. FIG. 1 illustrates this procedure.

Regarding interaction with users, people are seeking for loose inputs to mark foreground and background. Loosely positioned marking lines, like the strokes given by brush are more preferable than precise boundary definition. An exemplary case is shown in FIG. 2, where red (200) and blue (202) strokes are indicating foreground and background, respectively.

3-D CT volumetric image suffers from significant partial volume effect (PVE), a frequently-occurred phenomena due to the limited spatial resolution of the CT imaging device and the complex shape of tissue interfaces. As a consequence, the CT intensities of those voxels near tissue interfaces are actually mixtures of more than one tissue type which impose extra challenges for developing computerized CT segmentation algorithm.

Besides PVE, the 3-D teeth CT dataset has its own characteristics. First of all, teeth are bony tissue; however, not the only bony tissue present in the dental CT region. Other surrounding bony tissues include upper and lower jaws. Secondly, the CT intensities of teeth area, from top crown to bottom root, vary a lot. Finally, due to teeth's dense spatial arrangement, one tooth is connected to its neighboring teeth in the top crown part.

SUMMARY OF THE INVENTION

An interactive segmentation framework for 3-D teeth CT volumetric data enables a user to segment an entire dental region or individual teeth depending upon the types of user input. Graph cuts-based interactive segmentation utilizes a user's scribbles which are collected on several 2-D representative CT slices and are expanded on those slices. Then, a 3-D distance transform is applied to the entire CT volume based on the expanded scribbles. Bony tissue enhancement is added before feeding 3-D CT raw image data into the graph cuts pipeline. The segmented teeth area is able to be directly utilized to reconstruct a 3-D virtual teeth model.

In one aspect, a method of image processing programmed in a memory of a device comprises receiving input from a user, implementing 2-D scribble expansion, applying a 3-D distance transform to a result from the 2-D scribble expansion and executing graph cuts using the 3-D distance transform. The input comprises the user marking a foreground and a background. The method further comprises repeating steps until the user is satisfied with a result of the image processing. The method further comprises enhancing a bony region and using the enhanced bony region for graph cuts. Enhancing the bony region comprises performing 3-D CT partial volume voxel unmixing to generate a bony tissue mixture percentage map and pixel-wise multiplying an original 3-D CT image with the bony tissue mixture percentage map to generate a bony tissue enhanced 3-D CT image and an edge term for use with the graph cuts. Applying a 3-D distance transform comprises performing the 3-D distance transform on a CT volume data including using expanded foreground scribbles and original background scribbles to generate data terms. Executing graph cuts utilizes a data term and an edge term. The image processing occurs on a 3-D CT image of teeth. The method further comprises constructing a 3-D virtual teeth model. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.

In another aspect, a method of image processing programmed in a memory of a device comprises receiving input from a user indicating a foreground and a background of an image, implementing 2-D scribble expansion including performing a segmentation of 2-D CT slices where 2-D scribbles are located, applying a 3-D distance transform including performing the 3-D distance transform on a CT volume data including using expanded foreground scribbles and original background scribbles to generate data terms, enhancing a bony region of the image and executing graph cuts using a data term and an edge term as inputs. The method further comprises repeating steps until the user is satisfied with a result of the image processing. Enhancing the bony region comprises performing 3-D CT partial volume voxel unmixing to generate a bony tissue mixture percentage map and pixel-wise multiplying an original 3-D CT image with the bony tissue mixture percentage map to generate a bony tissue enhanced 3-D CT image and an edge term for use with the graph cuts. The image processing occurs on a 3-D CT image of teeth. The method further comprises constructing a 3-D virtual teeth model. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.

In another aspect, a device comprises a memory for storing an application, the application for: receiving input from a user, implementing 2-D scribble expansion, applying a 3-D distance transform to a result from the 2-D scribble expansion and executing graph cuts using the 3-D distance transform and a processing component coupled to the memory, the processing component configured for processing the application. The input comprises the user marking a foreground and a background. The method further comprises repeating steps i-iv until the user is satisfied with a result of the image processing. The application is further for enhancing a bony region. Enhancing the bony region comprises performing 3-D CT partial volume voxel unmixing to generate a bony tissue mixture percentage map and pixel-wise multiplying an original 3-D CT image with the bony tissue mixture percentage map to generate a bony tissue enhanced 3-D CT image and an edge term for use with the graph cuts. Applying a 3-D distance transform comprises performing the 3-D distance transform on a CT volume data including using expanded foreground scribbles and original background scribbles to generate data terms. Executing graph cuts utilizes a data term and an edge term. The image processing occurs on a 3-D CT image of teeth. The application is further for constructing a 3-D virtual teeth model.

DETAILED DESCRIPTION OF THE PREFERRED EMBODIMENT

An interactive segmentation framework for 3-D Teeth Commuted Tomography (CT) volumetric data is described herein. Under the guidance of user, the framework is able to either segment an entire dental region or individual teeth depending upon the types of user input. The segmented teeth area is able to be directly utilized to reconstruct a 3-D virtual teeth model.

A 3-D teeth CT volumetric image does not display meaningful texture or a color pattern which is able to be recognized by a sophisticated machine learning algorithm. Therefore, CT intensity associated with teeth CT images is a very important factor to develop a segmentation algorithm.

Other than CT intensity, the 3-D geometry of teeth also provides valuable information for developing the segmentation algorithm. However, not every single tooth is able to match the assumed teeth template, especially for injured or irregularly-shaped teeth that need cosmetic surgery. Moreover, teeth usually touch each other at the top crown part, and they share exactly the same CT intensity range. In order to segment an individual tooth apart from its surrounding teeth region, constraints are imposed for developing the segmentation algorithm.

Figure 1:
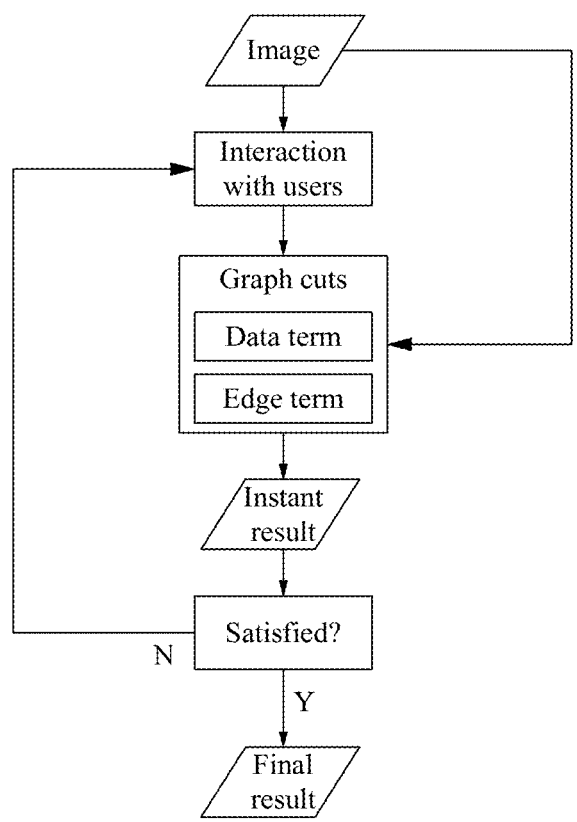
FIG. 1 illustrates an interactive segmentation framework according to some embodiments.
Figure 3:
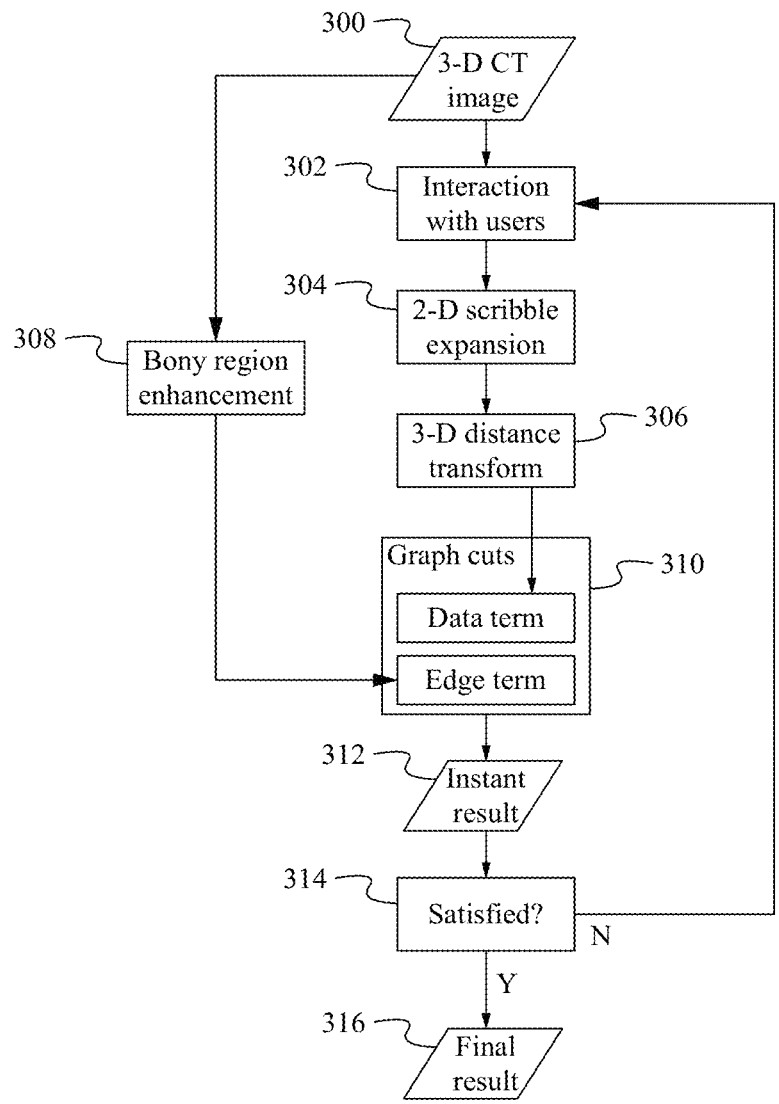
FIG. 3 illustrates an interactive segmentation framework according to some embodiments.

Compared with FIG. 1, there are 2 major differences shown in FIG. 3:

Before feeding foreground/background seeds directly into graph cuts segmentation pipeline, a user's scribbles which are collected on several 2-D representative CT slices are expanded on those slices. Then, a 3-D distance transform is applied to the entire CT volume based on the expanded scribbles. Another module called "Bony tissue enhancement" is added before feeding 3-D CT raw image data into the graph cuts pipeline.

FIG. 3 illustrates a flowchart of a method of interactive segmentation according to some embodiments. In FIG. 3, a 3-D CT image 300 is stored. In the step 302, users interact with the image such as by marking the foreground and background in different colors. In the step 304, 2-D scribble expansion is implemented, where a user's scribbles which are collected on several 2-D representative CT slices are expanded on those slices. In the step 306, a 3-D distance transform is applied, and the result is used for graph cuts. In the step 308, a bony region enhancement is implemented, and the result is used for the graph cuts. In the step 310, graph cuts are executed. In the step 312, an instant result is generated. In the step 314, it is determined if the user is satisfied with the result generated in the step 312. If the user is not satisfied, then the process returns to the step 302. If the user is satisfied, then a final result is generated in the step 316. In some embodiments, fewer or additional steps are implemented. In some embodiments, the order of the steps is modified.

Expand Foreground Scribbles on Representative 2-D CT Slices

Figure 2:
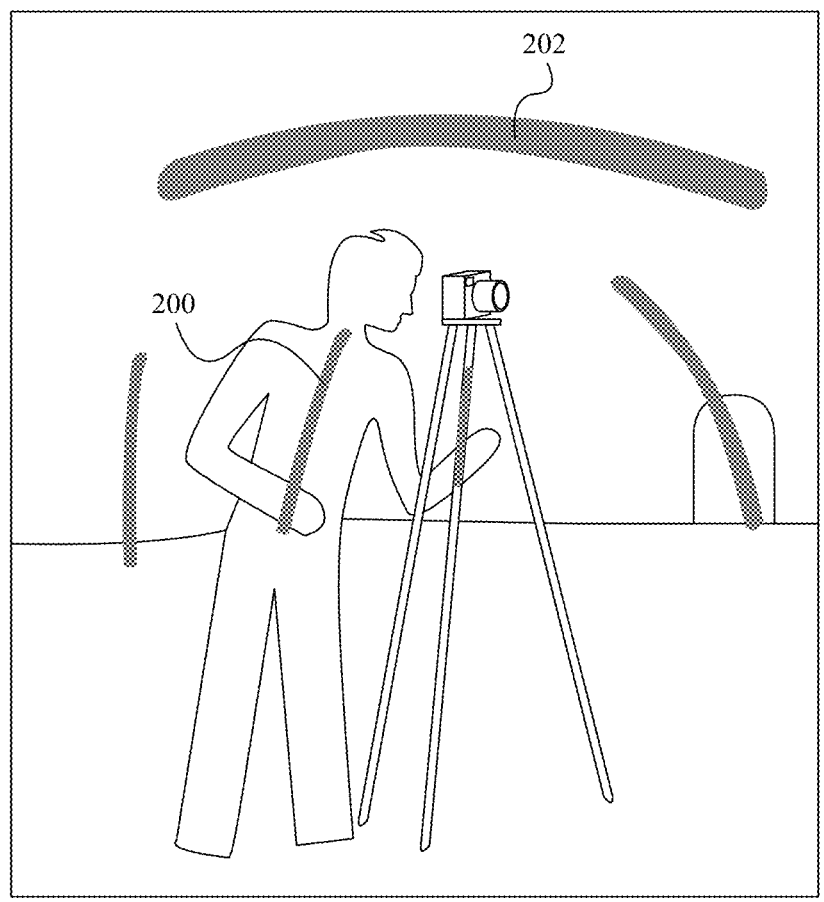
FIG. 2 illustrates an example of loosely positioned marking lines to indicate foreground and background according to some embodiments.
Figure 4:
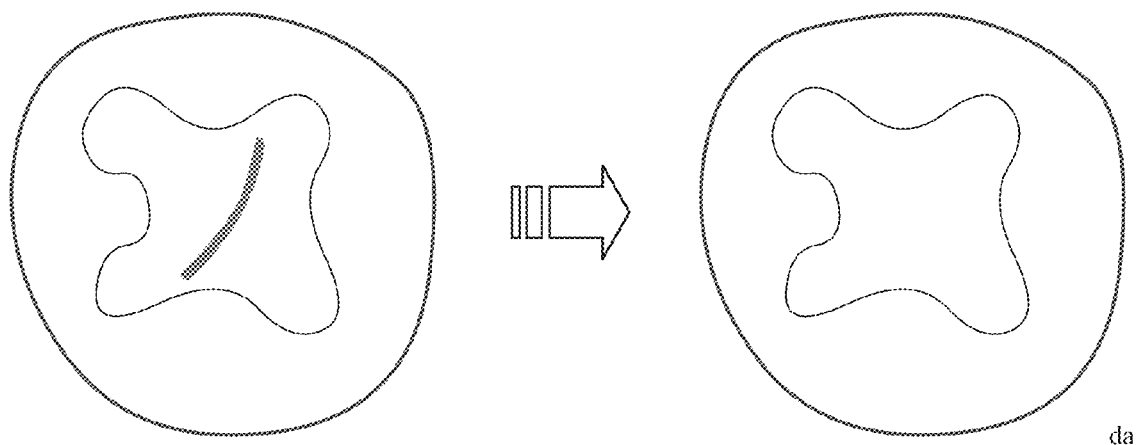
FIG. 4 illustrates a diagram of foreground scribble expansion on representative 2-D CT slices according to some embodiments.

A general graph-cuts based interactive segmentation framework encourages a user to give loose inputs like the scribbles in FIG. 2. Usually, the foreground and background scribbles are representative enough to facilitate the associated cost function derivation and the following optimization. For 3-D teeth CT volumetric data, the sparsely-located foreground scribbles are extended by conducting a simple segmentation on those 2-D CT slices where they are collected. FIG. 4 illustrates a diagram of foreground scribble expansion on representative 2-D CT slices.

Figure 5:
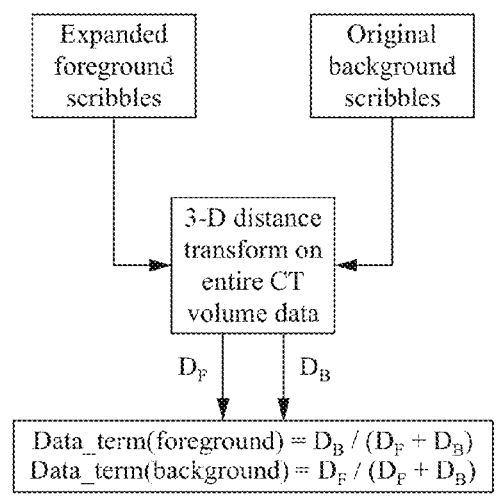
FIG. 5 illustrates a flowchart of a method of implementing 3-D distance transform according to some embodiments.

Apply 3-D Distance Transform Based on Expanded Scribbles to Define Data Term for Graph Cuts As indicated in FIG. 3, after getting a user's scribbles for both foreground and background, the 3-D distance transform is applied to define the data term for graph cuts. The detailed diagram is described in FIG. 5. Expanded foreground scribbles and original background scribbles are input, and a 3-D distance transform is performed on an entire CT volume data. The results include a data term for the foreground and a data term for the background.

Given foreground and background scribbles, two distance maps are calculated via the 3-D distance transform, representing the shortest distance from each pixel to foreground and background scribbles respectively, denoted by $D_F$ and $D_B$ respectively. There are many algorithms for conducting the 3-D distance transform including a geometry-preserving technique such as fast marching method.

Enhance Bony Region to Suppress PVE to Define Edge Term for Graph Cuts

Figure 6:
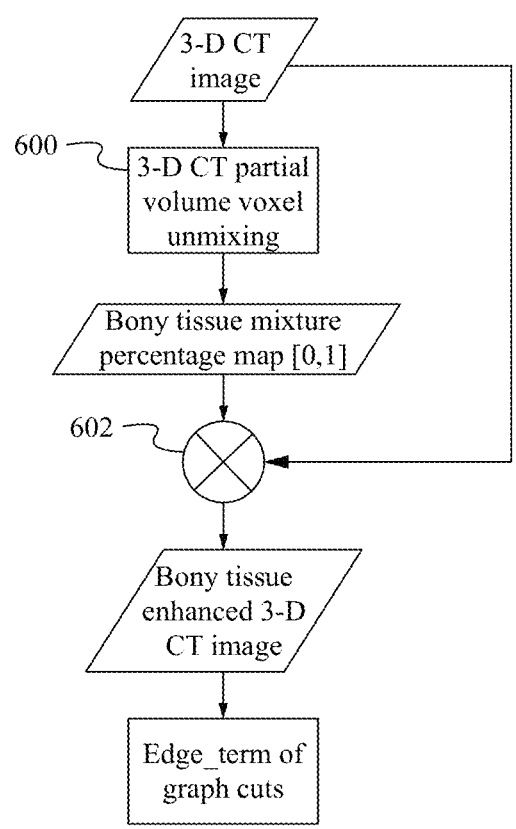
FIG. 6 illustrates a flowchart of a method of enhancing a bony region according to some embodiments.

As indicated in FIG. 3, instead of directly utilizing raw CT intensities to define the edge term for graph cuts, an enhance bony region is used to suppress PVE, so that the derived edge term will be more precise to locate teeth boundary. FIG. 6 illustrates a flowchart of a method of enhancing the bony region according to some embodiments. In the step 600, 3-D CT partial volume voxel unmixing is applied to the 3-D CT image. In the step 602, a bony tissue mixture percentage map[0,1] is pixel-wise multiplied with the 3-D CT image to produce a bony tissue enhanced 3-D CT image to be used for the edge term of the graph cuts.

Figure 7:
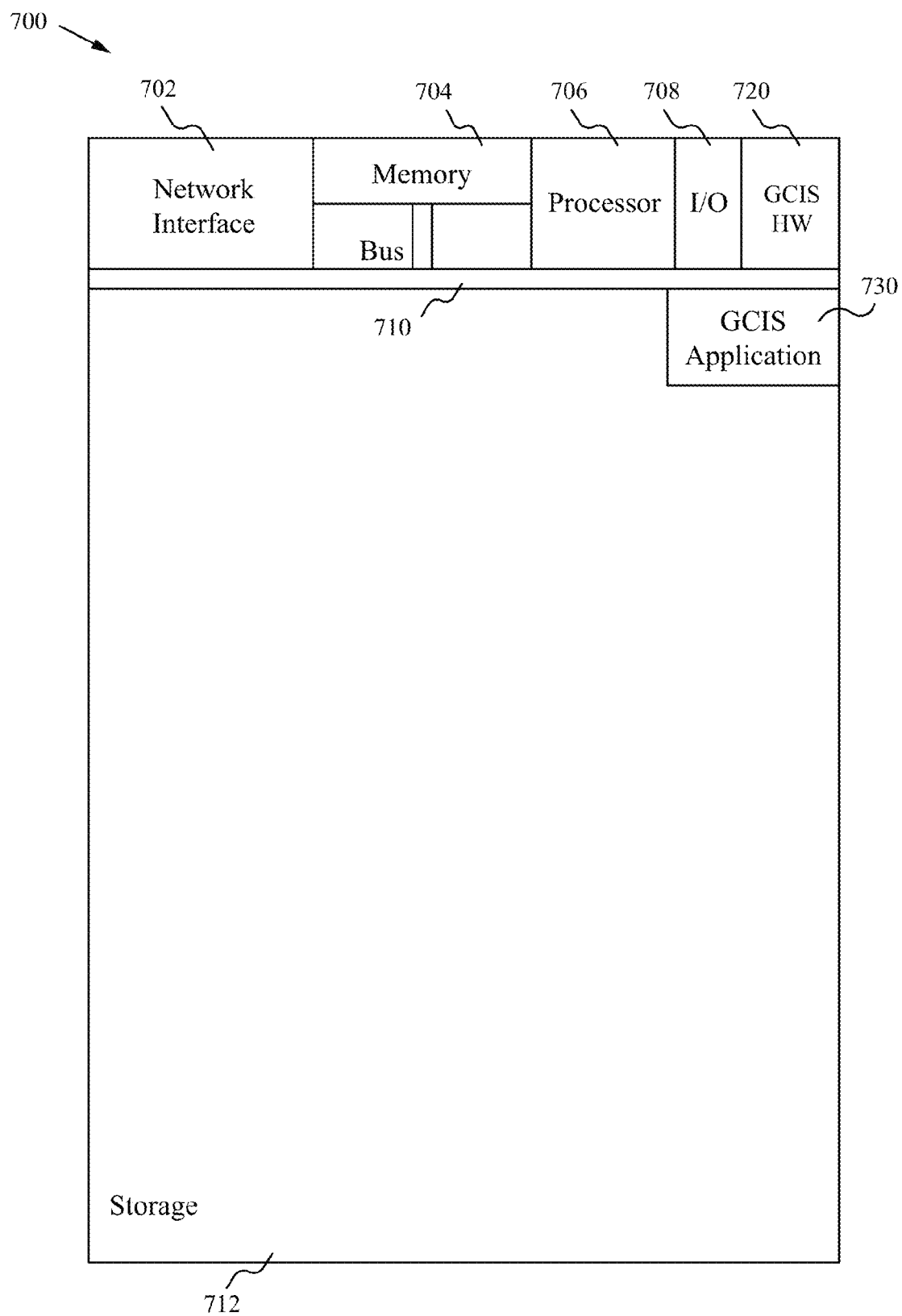
FIG. 7 illustrates a block diagram of an exemplary computing device configured to graph cuts-based interactive segmentation with spatial constraint according to some embodiments.

FIG. 7 illustrates a block diagram of an exemplary computing device 700 configured to implement the graph cuts-based interactive segmentation according to some embodiments. The computing device 700 is able to be used to acquire, store, compute, process, communicate and/or display information such as images. For example, a computing device 700 is able to be used to acquire and store an image. The graph cuts-based interactive segmentation is typically used during or after acquiring images. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, Blu-Ray®, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. In some embodiments, the hardware structure includes multiple processors and other hardware to perform parallel processing. Graph cuts-based interactive segmentation application(s) 730 used to perform graph cuts-based interactive segmentation are likely to be stored in the storage device 712 and memory 704 and processed as applications are typically processed. More or fewer components shown in FIG. 7 are able to be included in the computing device 700. In some embodiments, graph cuts-based interactive segmentation hardware 720 is included. Although the computing device 700 in FIG. 7 includes applications 730 and hardware 720 for implementing graph cuts-based interactive segmentation, the graph cuts-based interactive segmentation is able to be implemented on a computing device in hardware, firmware, software or any combination thereof. For example, in some embodiments, the graph cuts-based interactive segmentation applications 730 are programmed in a memory and executed using a processor. In another example, in some embodiments, the graph cuts-based interactive segmentation hardware 720 is programmed hardware logic including gates specifically designed to implement the method.

In some embodiments, the graph cuts-based interactive segmentation application(s) 730 include several applications and/or modules. In some embodiments, modules include one or more sub-modules as well.

Examples of suitable computing devices include a dental device, a microscope, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize the graph cuts-based interactive segmentation, a device such as a computer is able to be used to analyze an image. The graph cuts-based interactive segmentation is automatically used for performing image/video processing. The graph cuts-based interactive segmentation is able to be implemented automatically without user involvement.

In operation, graph cuts-based interactive segmentation overcomes many problems of past segmentation schemes. The segmented teeth area is able to be directly utilized to reconstruct a 3-D virtual teeth model.

Graph Cuts-Based Interactive Segmentation of Teeth in 3-D CT Volumetric Data

1. A method of image processing programmed in a memory of a device comprising:
   a. receiving input from a user;
   b. implementing 2-D scribble expansion;
   c. applying a 3-D distance transform to a result from the 2-D scribble expansion; and
   d. executing graph cuts using the 3-D distance transform.
2. The method of clause 1 wherein the input comprises the user marking a foreground and a background.
3. The method of clause 1 further comprising repeating steps a-d until the user is satisfied with a result of the image processing.
4. The method of clause 1 further comprising enhancing a bony region and using the enhanced bony region for graph cuts.
5. The method of clause 4 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.
6. The method of clause 1 wherein applying a 3-D distance transform comprises performing the 3-D distance transform on a CT volume data including using expanded foreground scribbles and original background scribbles to generate data terms.
7. The method of clause 1 wherein executing graph cuts utilizes a data term and an edge term.
8. The method of clause 1 wherein the image processing occurs on a 3-D CT image of teeth.
9. The method of clause 1 further comprising constructing a 3-D virtual teeth model.
10. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.
11. A method of image processing programmed in a memory of a device comprising:
   a. receiving input from a user indicating a foreground and a background of an image;
   b. implementing 2-D scribble expansion including performing a segmentation of 2-D CT slices where 2-D scribbles are located;
   c. applying a 3-D distance transform including performing the 3-D distance transform on a CT volume data including using expanded foreground scribbles and original background scribbles to generate data terms;
   d. enhancing a bony region of the image; and
   e. executing graph cuts using a data term and an edge term as inputs.

12. The method of clause 11 further comprising repeating steps a-d until the user is satisfied with a result of the image processing.
13. The method of clause 11 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.
14. The method of clause 11 wherein the image processing occurs on a 3-D CT image of teeth.
15. The method of clause 11 further comprising constructing a 3-D virtual teeth model.
16. The method of clause 11 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.
17. A device comprising:
   a. a memory for storing an application, the application for:
      i. receiving input from a user;
      ii. implementing 2-D scribble expansion;
      iii. applying a 3-D distance transform to a result from the 2-D scribble expansion; and
      iv. executing graph cuts using the 3-D distance transform; and
   b. a processing component coupled to the memory, the processing component configured for processing the application.
18. The device of clause 17 wherein the input comprises the user marking a foreground and a background.
19. The device of clause 17 further comprising repeating steps i-iv until the user is satisfied with a result of the image processing.
20. The device of clause 17 wherein the application is further for enhancing a bony region.
21. The device of clause 20 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.
22. The device of clause 17 wherein applying a 3-D distance transform comprises performing the 3-D distance transform on a CT volume data including using expanded foreground scribbles and original background scribbles to generate data terms.
23. The device of clause 17 wherein executing graph cuts utilizes a data term and an edge term.
24. The device of clause 17 wherein the image processing occurs on a 3-D CT image of teeth.
25. The device of clause 17 wherein the application is further for constructing a 3-D virtual teeth model.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of image processing programmed in a memory of a device comprising:
   a. receiving input from a user;
   b. implementing 2-D scribble expansion;
   c. applying a 3-D distance transform to a result from the 2-D scribble expansion; and
   d. executing graph cuts using the 3-D distance transform.
2. The method of claim 1 wherein the input comprises the user marking a foreground and a background.
3. The method of claim 1 further comprising repeating steps a-d until the user is satisfied with a result of the image processing.
4. The method of claim 1 further comprising enhancing a bony region and using the enhanced bony region for graph cuts.
5. The method of claim 4 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.
6. The method of claim 1 wherein applying a 3-D distance transform comprises performing the 3-D distance transform on a CT volume data including using expanded foreground scribbles and original background scribbles to generate data terms.
7. The method of claim 1 wherein executing graph cuts utilizes a data term and an edge term.
8. The method of claim 1 wherein the image processing occurs on a 3-D CT image of teeth.
9. The method of claim 1 further comprising constructing a 3-D virtual teeth model.
10. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.
11. A method of image processing programmed in a memory of a device comprising:
   a. receiving input from a user indicating a foreground and a background of an image;
   b. implementing 2-D scribble expansion including performing a segmentation of 2-D CT slices where 2-D scribbles are located;
   c. applying a 3-D distance transform including performing the 3-D distance transform on a CT volume data including using expanded foreground scribbles and original background scribbles to generate data terms;
   d. enhancing a bony region of the image; and
   e. executing graph cuts using a data term and an edge term as inputs.
12. The method of claim 11 further comprising repeating steps a-d until the user is satisfied with a result of the image processing.

13. The method of claim 11 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.

14. The method of claim 11 wherein the image processing occurs on a 3-D CT image of teeth.

15. The method of claim 11 further comprising constructing a 3-D virtual teeth model.

16. The method of claim 11 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a dental device, a microscope and a home entertainment system.

17. A device comprising:
   a. a memory for storing an application, the application for:
      i. receiving input from a user;
      ii. implementing 2-D scribble expansion;
      iii. applying a 3-D distance transform to a result from the 2-D scribble expansion; and
      iv. executing graph cuts using the 3-D distance transform; and
   b. a processing component coupled to the memory, the processing component configured for processing the application.

18. The device of claim 17 wherein the input comprises the user marking a foreground and a background.

19. The device of claim 17 further comprising repeating steps i-iv until the user is satisfied with a result of the image processing.

20. The device of claim 17 wherein the application is further for enhancing a bony region.

21. The device of claim 20 wherein enhancing the bony region comprises:
   a. performing 3-D CT partial volume voxel unmixing to generate a bony tissue mixture percentage map; and
   b. pixel-wise multiplying an original 3-D CT image with the bony tissue mixture percentage map to generate a bony tissue enhanced 3-D CT image and an edge term for use with the graph cuts.

22. The device of claim 17 wherein applying a 3-D distance transform comprises performing the 3-D distance transform on a CT volume data including using expanded foreground scribbles and original background scribbles to generate data terms.

23. The device of claim 17 wherein executing graph cuts utilizes a data term and an edge term.

24. The device of claim 17 wherein the image processing occurs on a 3-D CT image of teeth.

25. The device of claim 17 wherein the application is further for constructing a 3-D virtual teeth model.

* * * * *